(12) United States Patent
Roehring et al.

(10) Patent No.: US 9,790,036 B2
(45) Date of Patent: Oct. 17, 2017

(54) PRODUCT STAND-UP DEVICE

(71) Applicant: Robert Bosch GmbH, Stuttgart (DE)

(72) Inventors: Alexander Roehring, Jestetten-Altenburg (DE); Martin Rupf, Winterthur (CH); Patrick Nicklaus, Thayngen (CH)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/105,468

(22) PCT Filed: Dec. 12, 2014

(86) PCT No.: PCT/EP2014/077512
§ 371 (c)(1),
(2) Date: Jun. 16, 2016

(87) PCT Pub. No.: WO2015/091247
PCT Pub. Date: Jun. 25, 2015

(65) Prior Publication Data
US 2016/0311628 A1 Oct. 27, 2016

(30) Foreign Application Priority Data
Dec. 17, 2013 (DE) .................. 10 2013 226 317

(51) Int. Cl.
*B65G 47/252* (2006.01)
*B65B 35/44* (2006.01)
(Continued)

(52) U.S. Cl.
CPC .......... *B65G 47/252* (2013.01); *B65B 35/246* (2013.01); *B65B 35/44* (2013.01);
(Continued)

(58) Field of Classification Search
CPC .................................................. B65G 47/252
See application file for complete search history.

(56) References Cited

U.S. PATENT DOCUMENTS 1,582,820 A * 4/1926 Hungerford ....... B65G 47/1471
198/396
3,924,758 A * 12/1975 Gram ..................... B65B 35/50
414/798.4
(Continued)

FOREIGN PATENT DOCUMENTS

DE      1511849      1/1970
DE   102006032917   12/2007
(Continued)

OTHER PUBLICATIONS

International Search Report for Application No. PCT/EP2014/077512 dated Mar. 17, 2015 (English Translation, 3 pages).

*Primary Examiner* — Thomas Randazzo
(74) *Attorney, Agent, or Firm* — Michael Best & Friedrich LLP

(57) ABSTRACT

The invention relates to a product stand-up device (10) for standing up products (11) of a plurality of product columns (20) in stack rows (30), which are each associated with a product column (20), comprising a feeding unit (13) for products (11) lying flat, which feeding unit is common to the plurality of product columns (20), and/or a removal transport unit (16) for products (11) stood up in stack rows (30), at least one erecting path (12) for erecting the products (11) of at least one product column (20), and a plurality of shifting elements (21), which are each associated with a stack row (30) and are provided for producing an accommodating gap for lining up a following product (11) of the particular product column (20). According to the invention each shifting element (21) has a separately controllable driving means (22).

20 Claims, 3 Drawing Sheets

(51) Int. Cl.
*B65G 43/10* (2006.01)
*B65B 35/24* (2006.01)
*B65G 21/14* (2006.01)
*B65B 35/56* (2006.01)
*B65B 57/14* (2006.01)
*B65B 25/16* (2006.01)

(52) U.S. Cl.
CPC .............. *B65B 35/56* (2013.01); *B65B 57/14* (2013.01); *B65G 21/14* (2013.01); *B65G 43/10* (2013.01); *B65B 25/16* (2013.01)

(56) References Cited

U.S. PATENT DOCUMENTS

| | | | |
|---|---|---|---|
| 4,222,478 A | 9/1980 | Gasser | |
| 4,274,531 A * | 6/1981 | Whitmore | A23G 7/0037 198/397.03 |
| 4,744,201 A | 5/1988 | Total et al. | |
| 5,076,416 A * | 12/1991 | Spatafora | B65G 47/252 198/407 |
| 5,423,410 A * | 6/1995 | Keller | B65G 47/252 198/406 |
| 5,495,932 A * | 3/1996 | Dyess | B65G 47/252 198/416 |
| 5,979,634 A * | 11/1999 | Odegard | B65G 47/252 198/408 |
| 6,279,723 B1 * | 8/2001 | Zinno | B65G 47/57 198/406 |
| 8,708,132 B2 * | 4/2014 | Kelly | B65B 35/44 198/418 |
| 8,807,322 B2 * | 8/2014 | Cassoni | B65G 13/12 198/460.1 |
| 2010/0030373 A1 * | 2/2010 | Lee | B65B 35/44 700/223 |

FOREIGN PATENT DOCUMENTS

| | | |
|---|---|---|
| EP | 0057386 | 8/1982 |
| EP | 1722438 | 11/2006 |
| EP | 2149516 | 2/2010 |
| GB | 796969 | 6/1958 |
| WO | 2010102963 | 9/2010 |

* cited by examiner

PRODUCT STAND-UP DEVICE

BACKGROUND OF THE INVENTION

Product stand-up devices already exist for standing up products of a plurality of product columns in stack rows, which are each associated with a product column, comprising at least one feeding unit for products lying flat, which feeding unit is common to the plurality of product columns, and/or comprising at least one removal transport unit for products stood up in the stack rows, comprising at least one erecting path for erecting the products of at least one product column, and comprising a plurality of shifting means, which are each associated with a stack row and are provided for producing an accommodating gap for lining up a following product of the particular product column. Here, the shifting means have a common driving means and for example are formed as separating wheels arranged on a common shaft.

SUMMARY OF THE INVENTION

The invention proceeds from a product stand-up device for standing up products of a plurality of product columns in stack rows, which are each associated with a product column, comprising at least one feeding unit for products lying flat, which feeding unit is common to the plurality of product columns, and/or comprising at least one removal transport unit for products stood up in the stack rows, comprising at least one erecting path for erecting the products of at least one product column, and comprising a plurality of shifting means, which are each associated with a stack row and are provided for producing an accommodating gap for lining up a following product of the particular product column.

It is proposed for each shifting means to have a separately controllable driving means.

A "feeding unit" is to be understood in particular to mean a unit that has at least one transport means, for example a transport means formed as a conveyor belt, and transfers the products of the product columns from a delivery location, preferably a place of manufacture of the products, such as a furnace, and feeds said products to the erecting path. A "removal transport unit" is to be understood in particular to mean a unit on which the products are stood up in stack rows after having passed through the erecting path and on which the stack rows are transported further to a subsequent processing, for example packing. An "erecting path" is to be understood in particular to mean a path that is provided in order to erect a product entering the erecting path in a lying position into an upright position by passing said product through the path. In principle, an erected product, following erection by the erecting path, can be brought from the upright position into a tilted position, preferably a position tilted in the removal direction. The erecting path is preferably formed as a curved chute. The erecting path can alternatively be formed for example as a plane extending at an incline and/or as an inclined and/or curved diverting path of a circulating belt and/or round belt. The erecting path is preferably formed as a means provided in addition to the at least one feeding unit and/or the at least one removal transport unit. In principle, the erecting path can however also be formed in one piece with the at least one feeding unit and/or the at least one removal transport unit. In principle, the product stand-up device can have a separate feeding unit for each product column and a removal transport unit common to all product columns or a feeding unit common to all product columns and a separate removal transport unit for each product column. The product stand-up device preferably comprises a separate erecting path for each product column. The products that are stood up by means of the product stand-up device can have different forms, for example cuboidal forms with rectangular base area or semi-oval forms. The products can be formed by bakery goods, for example.

A "shifting means" is to be understood in particular to mean a means that is different from means of the removal transport unit and that is provided in order to move at least one erected product in the removal direction so as to produce an accommodating gap for a following product to be lined up with the stack row. The term "provided" is to be understood in particular to mean specially programmed, designed and/or equipped. The fact that an object is provided for a specific function is to be understood in particular to mean that the object satisfies and/or performs this specific function in at least one state of application and/or operation. In particular, the shifting means moves an erected product in the removal direction, said product forming an end member of the stack row, when there is no gap between the end member and a set-down point by the erecting path or the gap therebetween is too small. If, already without movement of the erected product, there is a sufficient gap to line up a following product, the shifting means can thus be controlled so as to come to a standstill or so as to move, such that the corresponding product remains unaffected by the shifting means. The shifting means can be formed for example as a separating wheel having protruding tooth elements, which wheel is driven in rotation, wherein, as a result of a rotation of the separating wheel, at least one protruding tooth element comes into contact with an erected product and exerts a force onto the erected product in order to move said product in the removal direction. In alternative embodiments the shifting means can be formed for example as a crank-and-rocker mechanism and/or an air nozzle, which moves the erected product by means of an airflow or an air jet. In addition, besides moving a product, the shifting means can also be provided to tilt a product that is to be moved, such that said product rests in part on an adjacent product in the stack row. The shifting means can also be provided to prevent an erected product from tipping over as a result of a forward movement of a conveyor belt when said product is stood up on a removal transport means formed as a conveyor belt. An "accommodating gap" is to be understood in particular to mean a free region at a rear end of the stack row, which region enables the lining up of a further product.

A "driving means" is to be understood in particular to mean a means that transfers a driving force onto the shifting means, for example a shaft moved by a motor, on which shaft there is mounted, non-rotatably, a shifting means formed as a separating wheel or as a pneumatic system that supplies an air nozzle with compressed air. The fact that "each shifting means has a separately controllable driving means" is to be understood in particular to mean that each shifting means has a driving means that can be operated independently of driving means of other shifting means. In particular, each shifting means can thus be operated at a different driving speed. In particular, a product stand-up device having shifting means drivable in a manner matched to particular conditions of individual product columns can be provided.

It is also proposed for the product stand-up device to comprise at least one sensor unit, which is provided to detect at least products of a product column. The sensor unit is preferably additionally provided to record positioning data of the products of the at least one product column. A "sensor unit" is to be understood in particular to mean a unit having at least one sensor element, which is provided to detect products of a product column and to detect the positioning data of the product. The term "provided" is to be understood in particular to mean specially designed and/or equipped. The fact that an object is provided for a specific function is to be understood in particular to mean that the object satisfies and/or performs this specific function in at least one state of application and/or operation. The sensor element is preferably formed as an optical sensor element, for example as a camera, as a light scanner or as a light barrier. In alternative embodiments the sensor element can be formed as a sensor element based on the measurement of other physical measurands, for example as an inductive sensor element or as a pressure sensor element. The sensor unit can detect products at different locations within the product stand-up device or can record positioning data of the products of the product columns at different locations, for example prior to entry into the erecting path and/or whilst passing through the erecting path and/or after having passed through the erecting path. The product stand-up device can also have a plurality of sensor units, which each record positioning data of products of at least one product column, in each case in one position, such that for example a first sensor unit records positioning data of the products prior to entry into the erecting path and a second sensor unit records positioning data of the products as these pass through the erecting path. The at least one sensor unit preferably comprises a separate sensor element for each product column. Additionally or alternatively to data concerning detected products and/or positioning data of products obtained by the at least one sensor unit, data transmitted via a data connection from a unit arranged upstream of the product stand-up device, for example a unit for manufacturing the products, and/or a unit arranged downstream of the product stand-up device, for example a packing device, to the product-stand-up device for controlling the shifting means can also be used for a control of the at least one shifting means. In particular, a unit for obtaining data for a control of the product stand-up device adapted to current process conditions in individual product columns can be provided.

It is also proposed for the product stand-up device to have at least one drive control unit, which is provided to control at least one of the shifting means depending on the recorded positioning data. A "drive control unit" is to be understood in particular to mean a unit comprising at least one control electronics and provided to control the driving means of the shifting means. A "control electronics" is to be understood in particular to mean a unit having a processor unit and having a memory unit and also having an operating program stored in the memory unit. The fact that "the drive control unit is provided to control at least one of the shifting means depending on the recorded positioning data" is to be understood in particular to mean that the drive control unit, on the basis of the recorded positioning data, controls the driving means to move a product of the stack row so as to produce an accommodating gap for the product of which the positioning data has been recorded, such that the product can be lined up with the stack row. By way of example, whilst a product is located on the erecting path, the drive control unit can control the shifting means suitably on the basis of positioning data recorded from said product, such that an accommodating gap for the product is ready at the moment at which the product comes to the end of its passage through the erecting path. In an alternative embodiment, on the basis of positioning data recorded from a product before said product has reached the erecting path and on the basis of data relating to a speed at which the product is brought to the erecting path and a speed at which said product is passed through the erecting path, the drive control unit can suitably control the shifting means so as to move at least one product of the stack row, such that an accommodating gap for the product is ready at a moment at which the product comes to the end of its passage through the erecting path. In particular, the drive control unit is provided to control, to a greater or lesser extent, a force of movement of the shifting means via the driving means depending on a density of products arriving in the product column and to be stood up in the stack row. In particular, it is possible to ensure that an accommodating gap is created in a timely manner.

In accordance with a development of the invention the drive control unit is provided to control the at least one of the shifting means in a manner synchronized with a product located on the erecting path. The term "control in a manner synchronized with a product located on the erecting path" is to be understood in particular to mean that the drive control unit controls the driving means of the shifting means depending on a detected product passing through the erecting path, such that an accommodating gap is produced during or following passage of the product located on the erecting path. In particular, an accommodating gap can be produced in a manner particularly robust with respect to sudden operational disruptions.

It is also proposed for the drive control unit to be provided to control at least one of the shifting means for each product merely with a single movement pulse. A "movement pulse" is to be understood in particular to mean an individual actuation process of the shifting means, which results in a movement of a product of the stack row of a product column, for example an individual partial revolution of a shifting means formed as a separating wheel, by means of which an individual tooth element can be brought into contact with the product to be moved and moves this where appropriate, or an individual jet of air of a shifting means formed as an air nozzle, which transfers a force onto the product sufficient to move the product that is to be moved. A partial revolution of the shifting means formed as a separating wheel with which two tooth elements are brought in succession into contact with the product to be moved, and move this, corresponds to two movement pulses. In particular, a low mechanical loading of products that are to be moved can be achieved.

It is also proposed for the product stand-up device to comprise a plurality of separately controllable linear movement units, which are provided to move at least the various shifting means in a linear manner. A "linear movement unit" is to be understood in particular to mean a unit that moves at least one shifting means along at least one linear axis within a predefined movement range. The linear axis is preferably formed parallel to an axis along which the row members of the stack rows are stood adjacently. Each linear movement unit is preferably associated with a shifting means of a product column. The linear movement unit is preferably provided to move the at least one shifting means in a manner synchronized with a linear movement of an end point of the erecting path so as to thus vary a standing location of a further product passing through the erecting path. In particular, the linear movement units can be provided to move, in addition to the shifting means of a product column, also at least one sub-unit of a feeding unit and/or a removal transport unit of the product column and/or an erecting path and/or a sensor unit associated with the product column. In an exemplary use of the linear movement units, in the event of a holdup of a removal transport of the stack row, a standing location of the further product passing through the erecting path is moved against the removal transport direction by a linear movement of the shifting means and of the end point of the erecting path, such that a construction of the stack row is continued in spite of a holdup of the removal transport. Accordingly, in the event of a holdup of a feed, a standing location can be moved forwards, in the removal transport direction. The linear movement of the shifting means can also be used to match a size of the accommodating gap to a size of products to be lined up. In particular, a product stand-up device that can be easily adapted to different product sizes, feed conditions and removal transport conditions can be achieved.

It is also proposed for the product stand-up device to have at least one movement control unit, which is provided to control at least one of the linear movement units depending on the recorded positioning data. A "movement control unit" is to be understood in particular to mean a control unit that is provided to control at least one of the linear movement units. The control unit formed as a movement control unit is preferably also formed as a drive control unit for the shifting means associated with the at least one linear movement unit. In principle, two separate control units can also be used as separate movement control unit and drive control unit. In particular, a product stand-up device that can be adapted with little effort to different product sizes and removal transport conditions can be achieved.

It is also proposed for the at least one sensor unit to be provided to record at least positioning data of a product last moved. In particular, the sensor unit is provided to check an orientation of the product last moved and to detect a tipped-over end member of a stack row. In particular, data can be obtained for premature problem identification and adaptation of operating parameters of the product stand-up device to problem situations.

It is also proposed for the product stand-up device to comprise auxiliary erecting units, which are each associated with a product column and are provided at least to assist an erection of the products. In particular, the auxiliary erecting units are provided to prevent erected products of the stack row of the product columns from tipping over into a lying state and to prevent an accommodating gap from being blocked by a tipped-over end member of the stack row. In particular, a number of operational disruptions can be reduced.

It is also proposed for the auxiliary erecting units to each have at least one air nozzle. In particular, the air nozzles can be designed to deliver a permanent airflow. The air nozzles are preferably provided to be operated in a clocked manner. In particular, an auxiliary erecting unit of simple construction can be achieved.

It is also proposed for the feeding unit to have at least one intermediate transport unit having a plurality of intermediate transport paths variable in terms of transport length, which are each associated with a product column. An "intermediate transport unit" is to be understood in particular to mean a transport unit that transfers products from an upstream transport unit of the feeding unit and transports said products to the erecting path or a further intermediate transport unit. The term "intermediate transport paths variable in terms of transport length" is to be understood in particular to mean transport paths that have means for varying the transport length. A "transport length" is to be understood in particular to mean a length of part of the transport path over which a product on the transport path is transported. By way of example, a transport length can be formed by a length of part of the transport path from a set-down point, at which the products are placed on the transport path, to a transfer point, at which the products are transferred to another element, for example the erecting path and/or another transport path. By way of example, the transport paths can be formed as conveyor belts, which are guided via a plurality of movable rolls, such that, by moving rolls relative to one another, a length of the conveyor belt between individual rolls can be varied, wherein a total length of the conveyor belt remains constant. Alternatively, transport paths formed as conveyor belts can have an embodiment with what is known as a pull-nose, in which case a front end region of the conveyor belt can be retracted, whereby an end point of the conveyor belt is moved. The pull-nose can also be used to allow a product arranged on the front end region to fall down onto another transport means by being retracted for the transfer. In particular, the change to the path length is provided in order to apply the products to the erecting path and/or in order to change the end point location of the erecting path in cooperation with a movement of the erecting path. A change to the path length can also be used to delay or accelerate a feed of a next product to the erecting path by appropriate extension or shortening of the path length. In particular, an additional possibility for adaptation of feed parameters can be achieved.

It is also proposed for the intermediate transport paths each to be operable at different speeds. In particular, a feed of the products to the erecting path can thus be adapted to removal transport conditions. By way of example, in the event of a removal transport jam, a feed can be slowed in order to gain time to rectify the removal transport jam, without completely stopping the product stand-up device. In particular, an additional possibility for adaptation of feed parameters can be achieved.

It is also proposed for the removal transport unit to have at least one storage unit, which is provided to receive at least one stack row for temporary storage. The fact that the storage unit is provided "for temporary storage of the at least one stack row" is to be understood in particular to mean that, in at least one operating state, products that are stood up in the at least one stack row are temporarily stored by means of the storage unit before they are transported from there to a removal transport means of the removal transport unit, for example a conveyor belt, which further transports the products for subsequent processing, for example for packing in a packing machine. In particular, the storage unit can comprise at least one conveyor belt formed as a storage belt, onto which erected products of the stack row are placed and by which said products are conveyed to a further removal transport belt and are guided to a subsequent processing, such as packing. In particular, at least in the event of a holdup of a removal transport of products of a product column erected in the stack row, said holdup being caused for example on account of a failure of a packing machine, the storage unit is provided to temporarily store further erected products of the stack row, such that a standing of products of the product column firstly can be continued. In this way, in the event of a removal transport holdup, it is possible to prevent a standing of products of the product column from having to be interrupted immediately whilst the removal transport holdup is remedied. In the event of an irregular feed of products of a product column, said products being delivered in a lying state by the feeding unit, the storage unit can also be provided to achieve a removal transport with a higher regularity in that, with a higher feed of products, a greater number of erected products are temporarily stored in the storage unit or are temporarily stored there for a longer time, and, with a lower feed, a built-up intermediate stock is depleted more quickly. The storage unit preferably comprises a plurality of conveyor belts, which are each associated with a stack row. In principle, the storage unit can also comprise an individual conveyor belt, which is associated with all stack rows, or a plurality of conveyor belts, which are each associated with a plurality of stack rows respectively. The plurality of conveyor belts can particularly preferably be moved at different speeds and/or are variable in length. In particular, a product stand-up device that can still be operated in the event of disruptions in the operating procedure during a subsequent processing of the stack rows and that does not have to be completely stopped immediately, and a product stand-up device that can be operated at constant speed with irregular feed or irregular removal transport can be achieved.

A method is also proposed for standing up products of a plurality of product columns in stack rows each associated with a product column, which products are transported via a common feeding unit and/or removal transport unit and are erected by means of at least one erecting path, wherein, in at least one operating state, end members of a stack row are moved by means of shifting means, which are each associated with a stack row, for a lining up of a following product of the particular product column, in which the shifting means are controlled separately from one another. In particular, an adaptation of a method sequence to different operating conditions in different product columns can be achieved.

BRIEF DESCRIPTION OF THE DRAWINGS

Further advantages will emerge from the following description of the drawings. An exemplary embodiment of the invention is illustrated in the drawings. The drawings, the description and the claims contain numerous features in combination. A person skilled in the art will also expediently consider the features individually and combine these to form useful further combinations.

In drawings.

DETAILED DESCRIPTION

Figure 1:
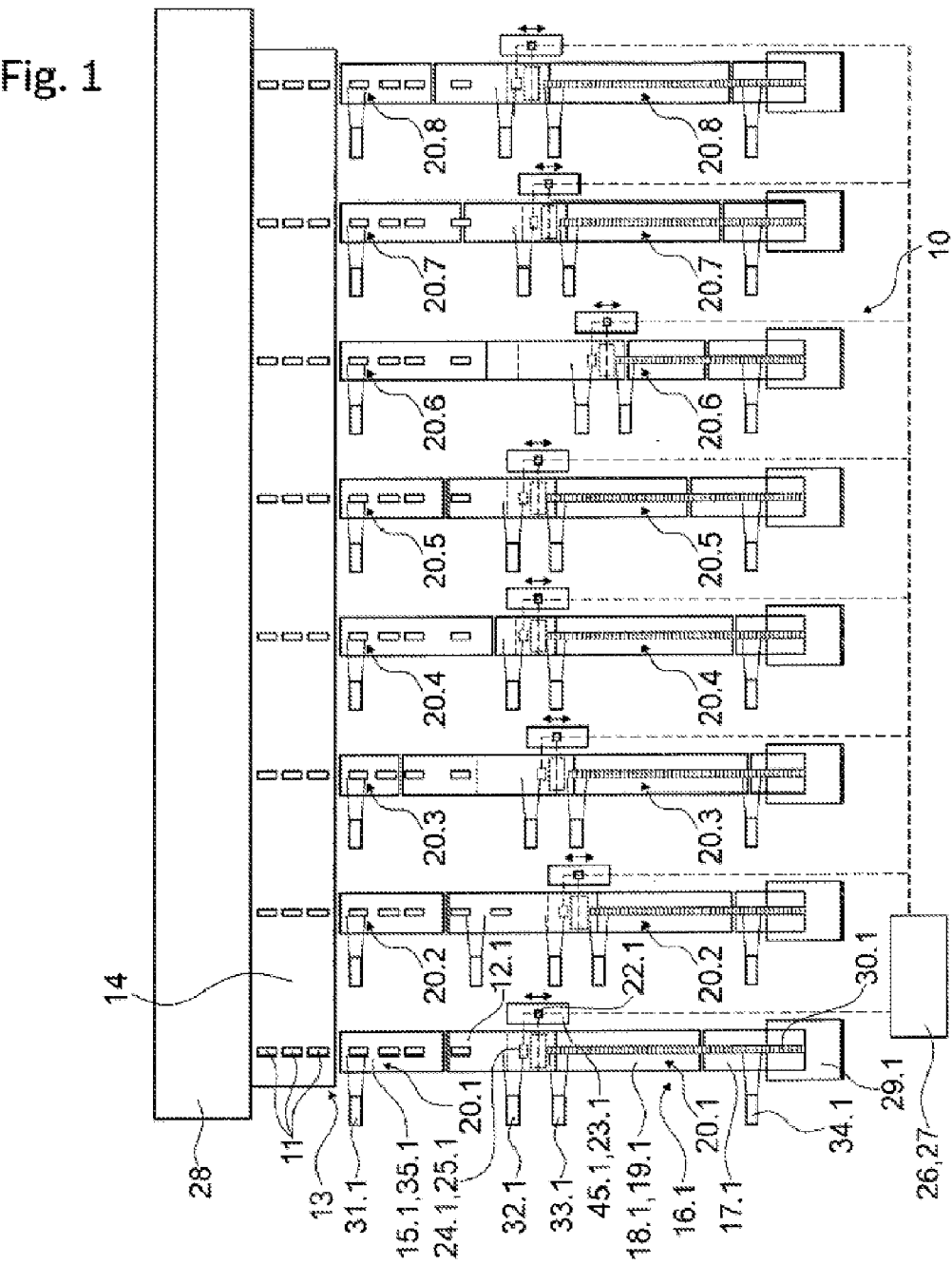
FIG. 1 shows a schematic view from above of a product stand-up device for standing up products of eight product columns in each case in stack rows each having shifting means associated with a stack row, each of said shifting means having a separately controllable driving means.

FIG. 1 shows a product stand-up device 10 for standing up products 11 of eight product columns 20.1, 20.2, 20.3, 20.4, 20.5, 20.6, 20.7, 20.8. The product stand-up device 10 has identical units and elements for each of the eight product columns 20.1, 20.2, 20.3, 20.4, 20.5, 20.6, 20.7, 20.8. The units and elements are therefore illustrated in FIG. 1 with indexing numbers 1-8 for the individual product columns 20.1, 20.2, 20.3, 20.4, 20.5, 20.6, 20.7, 20.8, wherein, for improved clarity of the schematic illustration in FIG. 1, the identical units and elements for each of the eight product columns 20.1, 20.2, 20.3, 20.4, 20.5, 20.6, 20.7, 20.8 have been provided with reference signs with indexing numbers only for the first product column 20.1. Units that are common to each of the eight product columns 20 are identifiable in FIG. 1 in that they do not have an indexing number. In order to improve the readability of the description, the indexing numbers of the relevant units and elements are not specified when describing a function of said units and elements.

The product stand-up device 10 is provided to stand up products 11 of the product columns in stack rows 30, which are each associated with a product column 20, and comprises a feeding unit 13 for products 11 lying flat, which feeding unit is common to the plurality of product columns 20, and comprises removal transport units 16 for products 11 stood up in stack rows 30, each removal transport unit being associated with a product column 20, and comprises an erecting path 12 for erecting the products 11 of a product column 20, and comprises eight shifting means 21, which are each associated with a stack row 30 and are provided to produce an accommodating gap for lining up a following product 11 of the particular product column 20, which product is to be lined up with the stack row 30. Each of the shifting means 21 has a separately controllable driving means 22.

The product stand-up device 10 is provided to carry out a method for standing up products 11 of a plurality of product columns 20 in stack rows 30 each associated with a product column 20, which products are transported via a common feeding unit 13 and separate removal transport units 16 and are erected by means of at least one erecting path 12, wherein end members 38 of a stack row 30 are moved by means of shifting means 21, which are each associated with a stack row 30, in order to line up a following product 11 of the particular product column 20, wherein the shifting means 21 are controlled separately from one another.

The products 11 are formed by cuboidal bakery goods having a rectangular basic shape, which are referred to as biscuits, which, lying on a side having the maximum surface area, exit a production device 28, which comprises a furnace as the final element, are delivered from the feeding unit 13 to the erecting path 12 and, by passing through the erecting path 12, are stood up in stack rows 30, erected on edges having short sides, and are transported from the removal transport unit 16 to packing devices 29. Alternatively, the production device 28 may comprise for example a cooling tunnel as last element. In an alternative embodiment a device for applying cream to the products 11 and for connecting two biscuits via cream sides to create a sandwich form can additionally be integrated in the production device 28. In the packing device 29, a specific number of products 11 are separated from the stack row 30 to form a packing group and are packed. In this exemplary embodiment of the invention each product column 20 is allocated an individual packing device 29.

The feeding unit 13 comprises a common feeding belt 14 and an intermediate transport unit 15 having a plurality of intermediate transport paths 35 variable in terms of transport length, which are each associated with a product column 20. A change in length of the transport length of the intermediate transport paths 35 is implemented via a pull-nose function, wherein a concertina-like extension mechanism 36 (FIG. 4) ensures that the intermediate transport paths 35 are sufficiently supported independently of the transport length. The intermediate transport paths 35 are each operable at different speeds, such that the products 11 can be guided more quickly in the feeding unit 13 to the erecting path 12 by acceleration of the intermediate transport path 35 in order to compensate for a decreasing delivery density of the products 11, or the products 11 can be guided more slowly in the feeding unit 13 to the erecting path 12 by slowing the intermediate transport path 35 in order to compensate for an increasing delivery density. The products 11 are discharged from the production device 28 by means of the common feeding belt 14.

Figure 2:
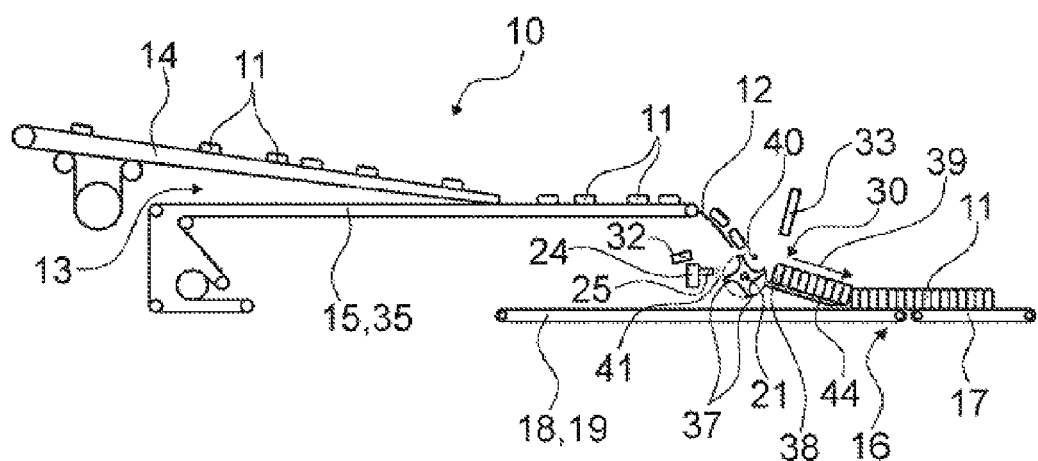
FIG. 2 shows a schematic side view of an illustration of a portion of the product stand-up device for an individual product column.

The removal transport units 16 comprise a storage unit 18 for each product column 20, said storage unit 18 comprising a storage belt 19 and a removal transport belt 17, which transfers the stack rows 30 from the storage belt 19 or on which alternatively the products 11 are placed directly from the erecting path 12 in order to form the stack rows 30. After passing through the erecting path 12, the products 12 are firstly placed on a straight chute 44, from which they slide onto the storage belt 19 (FIG. 2). The removal transport belt 17 transports the stack rows 30 into the packing device 29. The storage unit 18 is provided to receive the stack rows 30 for temporary storage. In an alternative embodiment of the product stand-up device 10, the removal transport unit 16 can be provided jointly for all product columns 20 and can have a common, continuous removal transport belt 17, which feeds the stack rows 30 to the packing device 29. An operating principle of the storage unit 18 will be discussed in greater detail further below. In an alternative embodiment of the product stand-up device 10, the stack rows 30 can also be fed for a subsequent processing different from packing, for example a sprinkling or a filling of hollow interiors.

The separately controllable driving means 22 of the shifting means 21 each comprise a separate driving motor, which is connected to the relevant driving means 22 via a dedicated shaft. The driving means 22 each have a linear movement unit 23, which is provided in order to move the driving means 22 in a linear manner into the product columns 20 in a direction parallel to a removal transport direction 39 of the products 11. The linear movement is provided in order to vary a position of a set-down location for a following product 11 of the product column 20 with the stack row 30 on the removal transport unit 16. The linear movement units 23 here cooperate with the storage unit 18 to compensate for an irregular delivery density and/or removal transport density of the products 11. The linear movement units 23 can alternatively or additionally also be provided and designed to move the driving means 22 into the product columns 20 in a direction perpendicular to the removal transport direction 39 of the products 11 in order to vary a position of contact of the shifting means 21 with the products 11 that are to be moved.

The shifting means 21, as what is known as a separating wheel, is a gearwheel mounted on the shaft and having four protruding tooth elements 37 uniformly distributed over a circumference. The shifting means 21 is set in rotation in a direction of rotation 40 via the shaft, wherein, as a result of the rotation, a tooth element 37 coming into contact with a product 11 exerts a force onto the product 11 and moves this in the removal transport direction 39, such that an accommodating gap for lining up a following product 11 with the stack row 30 is produced. In alternative embodiments the shifting means 21 can be formed by way of example as a crank-and-rocker mechanism or can exert the force by means of air pressure onto the product 11 that is to be moved. The product 11 that is to be moved is formed by an end member 38 of the stack row 30. In addition to the movement in the removal transport direction 39, the end member 38 is tilted in the removal transport direction 39 by the shifting means 21, such that the end member 38 comes to lie in part on a product 11 arranged adjacently in the stack row 30. The standing in the stack row 30, in which the products 11 stood up in the stack row 30 are tilted in the removal transport direction 39, is also referred to as a shingling of the products 11.

The product stand-up device 10 also comprises auxiliary erecting units 24, which are each associated with a product column 20 and are provided to assist the erection of the products 11. The auxiliary erecting units 24 each have an air nozzle 25 (FIG. 2). The air nozzles 25 are controlled in order to apply an airflow 41 to the product 11 that is to be moved, so as to prevent the product 11 from tipping back against the removal transport direction 39 during the movement. The airflow 41 is applied here to the product 11 by the air nozzle 25 above a center of gravity of the product 11 that is to be moved. In an alternative embodiment the air nozzle 25 can also be designed to permanently discharge an airflow 41. The product stand-up device 10 comprises, for each product column 20, a first sensor unit 31, a second sensor unit 32, a third sensor unit 33, and a fourth sensor unit 34, which are each provided to detect products 11 of a product column 20 and to record positioning data of the products 11 of the product column 20. The sensor units 31, 32, 33, 34, which are each associated with one of the product columns 20, each have optical sensor elements, which are provided in order to determine the positioning data. The sensor unit 32 is formed as a light barrier and comprises a light source, a reflector 42, which reflects light of the light source, and a photodiode, which detects reflected light. The sensor unit 33 is formed as a light scanner, in which a light source and photodiode are accommodated in a common housing and a product 11 is detected by evaluation of light reflected by the product 11, and positioning data relating to said product is determined. In alternative embodiments of the product stand-up device 10, it is conceivable for the sensor units 31, 32, 33, 34 to have optical sensor elements formed differently, for example as cameras, or to have sensor elements that measure other physical measurands as optical measurands. The first sensor unit 31 is provided to measure positioning data of products 11 located on the intermediate transport path 35 of the intermediate transport unit 15 and determines the positioning data of delivered products 11 for a control that is coordinated with a number density and delivery rate. The second sensor unit 32 is provided to determine positioning data of products 11 located on the erecting path 12. The third sensor unit 33 is provided to determine positioning data of a product 11 last moved, which product forms an end of the particular stack row 30. By adaptation of a position of the erecting path 12 and a linear movement of the shifting means 21 or by an adaptation of the storage unit 18, the third sensor unit 33 is used to detect whether the product 11 last moved has fallen over, in order to prevent products 11 that have passed through the erecting path 12 from being stood up on the product 11 last moved that has fallen over, and therefore in order to prevent interruptions to the operating procedure. The fourth sensor unit 34 is provided to detect positioning data of products 11 on a removal transport belt 17 and in particular to sense from the positioning data a holdup of a removal transport.

The product stand-up device 10 has a drive control unit 26, which is common to all product columns 20 and which controls the shifting means 21 depending on the recorded positioning data. The drive control unit 26 is provided to control the shifting means 21 in a manner synchronized with a product 11 located on the erecting path 12 associated with the product column 20 with which the shifting means 21 in question is associated. Positioning data of the product 11 located on the erecting path 12 is determined by means of the sensor unit 32 and transferred to the drive control unit 26.

The drive control unit 26 controls the shifting means 21 for each product 11 which is to be moved in order to produce an accommodating gap, in each case by means of an individual movement pulse. In an individual movement pulse the product 11 is acted on with a force one individual time by the shifting means 21. The product 11 is thus loaded to a lesser extent than in a previously conventional product stand-up device, in which shifting means 21 are driven for a plurality of product columns 20 by a common driving means 22. In the case of the previously conventional product stand-up devices, in order to ensure that each product 11 that has passed through an erecting path 12 is moved by a shifting means 21, a driving rate of the shifting means 21 is selected to be higher than an average rate of passage of the products 11 through the erecting path 12, whereby products 11 are acted on with a force by the shifting means 21, repeatedly in part. The product stand-up device 10 also comprises a movement control unit 27, which controls the linear movement units 23 depending on the recorded positioning data. The linear movement units 23 are controlled depending on the positioning data determined by the sensor units 31, 33, 34. In alternative embodiments of the product stand-up device 10, a separate drive control unit 26 can be used for each shifting means 21 and/or a separate movement control unit 27 can be used for each linear movement unit 23.

The storage unit 18 comprises a storage belt 19, on which the products 11 that have passed through the erecting path 12 are placed. By moving the erecting path 12 along or against the removal transport direction 39 by means of a movement means (not illustrated in greater detail) and linear movement of the shifting means 21 associated with the erecting path 12 by the linear movement unit 23 of the shifting means 21, a placement location of the products 11 on the storage belt 19 is changed. The storage belt 19 can be varied in terms of transport length and can be moved at different speeds. Storage belts 19 that are associated with different product columns 20 can be moved independently of one another at different speeds. If a packing of products 11 of the stack row 30 by the packing device 29 is delayed or if the packing device 29 fails, the storage belt 19 and the removal transport belt 17, which feeds the packing device 29, can be operated at a lower speed or can be stopped, and the storage belt 19 of the storage unit 18 can continue to be loaded by the stack row 30 at the same time by moving the erecting path 12 against the removal transport direction 39. Provided the storage belt 19 still has capacity to line up further products 11 with the stack row 30, the standing of the products 11 of the particular product column 20 in stack rows 30 can be continued.

Figure 3:
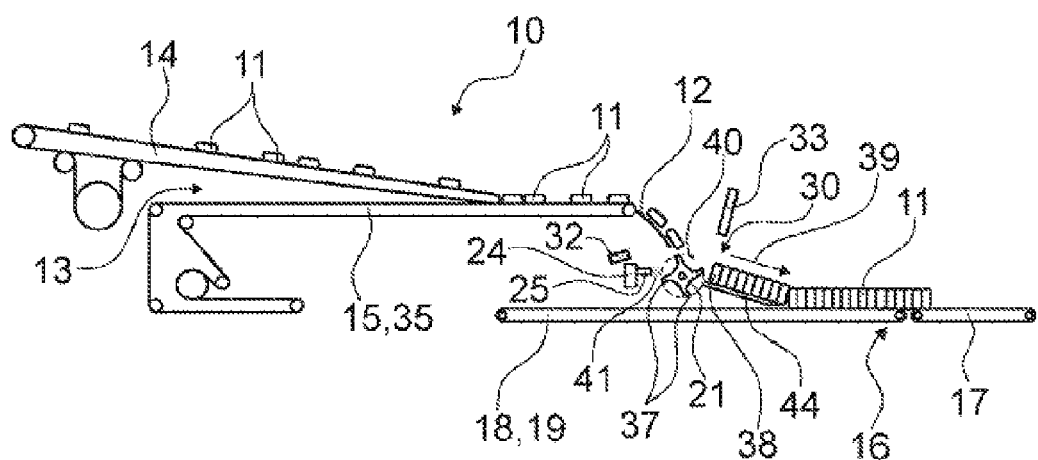
FIG. 3 shows a schematic side view of an illustration of a portion of the product stand-up device for an individual product column, wherein an erecting path and the shifting means have been moved linearly compared with FIG. 2.

In the event of an operational jam, in which a packing by the packing device 29 is delayed, or in the event of an operational interruption of the packing device 29, it is therefore not necessary to immediately interrupt a standing of the products 11 in the stack row 30 whilst the operational jam or the operational interruption is remedied. In the case that products 11 are exiting the production device 28 and the associated packing device 29 for said products is suffering from an operational jam or operational interruption, it is also not necessary to remove said products of the product column 20 from the subsequent processing process immediately upon occurrence of the operational jam or the operational disruption prior to or following passage through the erecting path 12. By forming the shifting means 21 with separately controllable driving means 22, and separately controllable linear movement units 23, and by arrangement of the shifting means 21 on separate shafts, the placement location for products 11 on the storage belt 19 can be individually set for each product column 20, such that an operational jam or an operational disruption can be compensated for at least in part during a subsequent processing of a stack row 30 of a product column 20 by the packing device 29 by building up a corresponding stock of the stack row 30, such that a standing of products 11 of a particular product column 20 can be continued at least temporarily instead of having to immediately stop the product column 20 or remove products 11 of the product column 20 from the product stand-up device. Accordingly, in the event of a delivery interruption or delivery delays, the subsequent processing of products 11 of the product column 20 in question can be continued for longer, by building up a stock of the product column 20 in question, than without storage possibility, such that additional time can be gained in order to remedy the delivery interruption or the delivery delays, whilst at the same time ensuring that the product column 20 in question is still available for subsequent processing. In the event of an operational jam or operational interruption, there is also no need to stop the entire product stand-up device 10 whilst the operational jam or the operational interruption is remedied, as is necessary in the case of previously known product stand-up devices 10, in which a plurality of shifting means 21 are arranged on a common shaft and therefore cannot be moved relative to one another. By way of example, a process of this type is illustrated in FIGS. 2 and 3. FIG. 3 schematically shows an operating state of the product stand-up device 10 in which the storage belt 19 of the storage unit 18 has been further filled compared with an operating state illustrated in FIG. 2 by moving the erecting path 12 and by linear movement of the shifting means 21. The storage belt 19 and the removal transport belt 17 are stopped here, such that the stack row 30 is unmoved and following products 11 are lined up with the stack row 30 by continuous movement of the erecting path 12 and linear movement of the shifting means 21 to the rear. Whilst the storage belt 19 is loaded and the storage belt 19 and the removal transport belt 17 are stopped, an operational jam or operational interruption of the packing device 29 it can be remedied. Once the operating jam or the operating interruption have been remedied, the storage belt 19 and the removal transport belt 17 are set in motion again and a stored stock on the storage belt 19 is gradually depleted. The temporary storage in the storage unit 18 is assisted by the intermediate transport unit 15 comprising the intermediate transport path 35 by lengthening the intermediate transport path 35 and operating this at reduced speed, such that products 11 can be temporarily stored also with the intermediate transport unit 15.

In the event of irregular discharge of products 11 from the production device 28, the storage unit 18 and the intermediate transport unit 15 are also used to achieve a uniform feed to the packing devices 29 by adaptation of transport speeds and by temporary storage of the products 11 before or after being stood up in stack rows 30, such that these packing devices can be operated at uniform speeds. A uniform discharge of packs containing packed pack groups is thus achieved.

Figure 4:
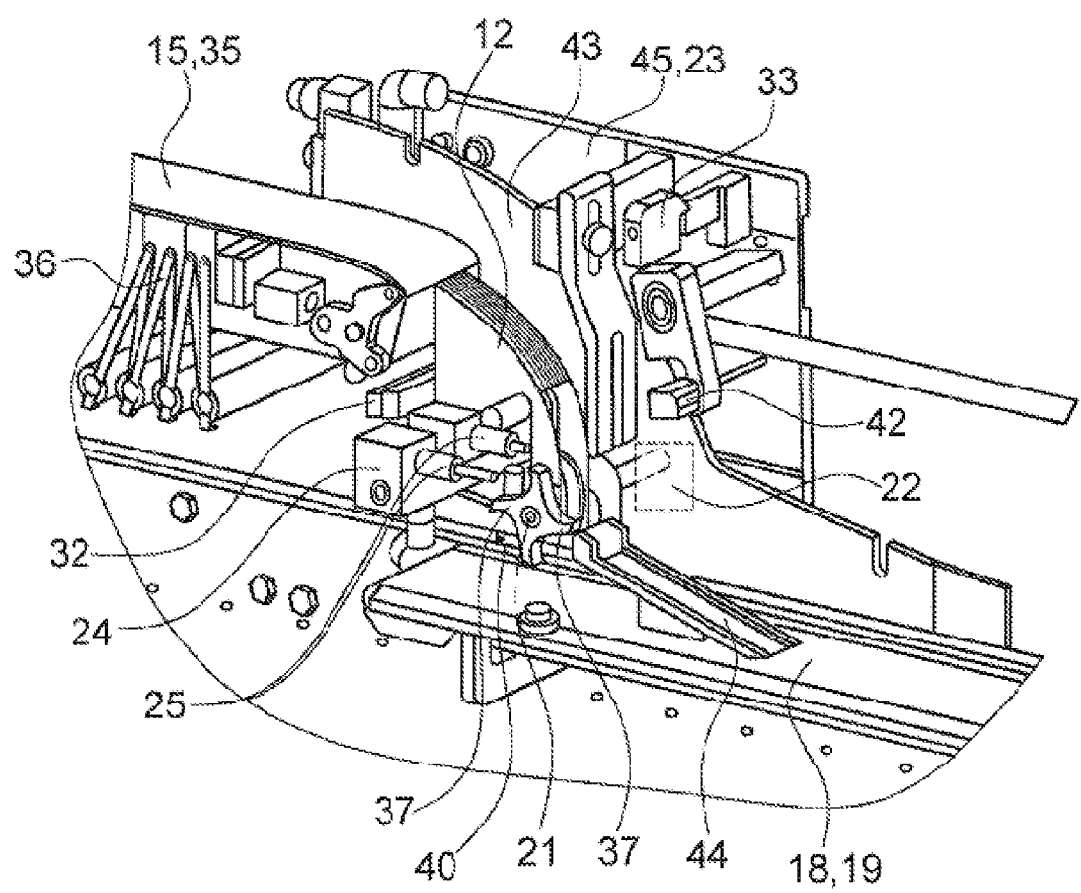
FIG. 4 shows an illustration of a portion of the product stand-up device for an individual product column with a detailed view of the erecting path and of the shifting means.

FIG. 4 shows a portion of the product stand-up device 10 in a detailed view. The intermediate transport path 35 of the intermediate transport unit 15 is illustrated together with the concertina-like extension mechanism 36. The intermediate transport path 35 of the intermediate transport unit 15 has what is known as a "pull-nose function" and can be extended and retracted at one end. The erecting path 12 is fixedly secured at this end of the intermediate transport path 35 and is thus also entrained. The concertina-like extension mechanism 36, when extended, ensures a sufficient stability of the extended region. In an alternative embodiment the intermediate transport path 35 can be formed such that a front part of the intermediate transport path 35 is retracted when a product 11 is located there, the product 11 thus being placed on the erecting path 12. By means of positioning data of the first sensor unit 31, data is obtained in order to control the pull-nose function. The sensor units 32, 33, the shifting means 21 comprising the driving means 22, and the auxiliary erecting unit 24 comprising the air nozzle 25 are secured to two support shields 43 of a movable carriage 45, wherein one of the support shields 43 has been masked out in FIG. 4. The movable carriage 45 is coupled to a drive for the pull-nose function and is entrained accordingly when the transport length of the intermediate transport path 35 changes. The movable carriage 45 thus forms part of the linear movement unit 23. The movable carriage 45 is driven by the drive for the pull-nose function, but in principle can instead have a dedicated drive. The driving means 22 of the shifting means 21, said means being formed as a drive motor, is hidden in FIG. 4 by the support shield 43.

What is claimed is:

1. A product stand-up device for standing up products (11) of a plurality of product columns (20) in stack rows (30), which are each associated with a product column (20), comprising
a feeding unit (13) for feeding products (11) lying flat in a removal direction, wherein the feeding unit (13) is common to the plurality of product columns (20);
a plurality of erecting paths (12), wherein, for each product column (20), there is a respective erecting path (12), wherein each erecting path (12) erects the products (11) of the respective product column (20) while the products (11) are moving in the removal direction;
a plurality of shifting means (21), wherein, for each product column (20), there is a respective shifting means (21) associated with a respective stack row (30), wherein each shifting means (21) moves at least one erected product (11) in the removal direction for producing an accommodating gap for lining up a following product (11) with the stack row (30) of the respective product column (20), wherein each shifting means (21) has a separately controllable driving means (22);
a plurality of removal transport units (16), wherein, for each product column (20), there is a respective removal transport unit (16), wherein each removal transport unit (16) removes products (11) that are erected in stack rows (30) in the removal direction; and
a plurality of separately controllable linear movement units (23), which move at least the shifting means (21) in a linear manner.

2. The product stand-up device as claimed in claim 1, characterized by at least one sensor unit (31, 32, 33, 34), which is provided to detect products (11) of at least one product column (20), and by at least one movement control unit (27), which is provided to control at least one of the linear movement units (23) depending on recorded positioning data.

3. The product stand-up device as claimed in claim 1, wherein the plurality of separately controllable linear movement units (23) move the shifting means (21) and the erecting path (12) relative to the feeding unit (13) and the removal transport unit (16) in a direction that is parallel to the removal direction.

4. The product stand-up device as claimed in claim 1, characterized by auxiliary erecting units (24), which are each associated with a product column (20) and are provided at least to assist the erection of the products (11).

5. The product stand-up device as claimed in claim 4, characterized in that the auxiliary erecting units (24) each have at least one air nozzle (25).

6. The product stand-up device as claimed in claim 1, characterized in that the feeding unit (13) has at least one intermediate transport unit (15) having a plurality of intermediate transport paths (35) variable in terms of transport length, which are each associated with a production column (20).

7. The product stand-up device as claimed in claim 6, characterized in that the intermediate transport paths (35) are each operable at different speeds.

8. The product stand-up device as claimed in claim 1, characterized by at least one sensor unit (31, 32, 33, 34), which is provided to detect products (11) of at least one product column (20).

9. The product stand-up device at least as claimed in claim 8, characterized in that the at least one sensor unit (33) is provided to record at least positioning data of a product (11) last moved.

10. The product stand-up device as claimed in claim 8, characterized by at least one drive control unit (26), which is provided to control at least one of the shifting means (21) depending on recorded positioning data.

11. The product stand-up device as claimed in claim 10, characterized in that the drive control unit (26) is provided to control the at least one of the shifting means (21) in a manner synchronized with a product (11) located on the erecting path (12).

12. The product stand-up device as claimed in claim 10, characterized in that the drive control unit (26) is provided to control the at least one of the shifting means (21) for each product (11) merely with a single movement pulse.

13. The product stand-up device as claimed in claim 1, wherein each erecting path (12) is formed as a curved chute.

14. The product stand-up device as claimed in claim 1, wherein each erecting path (12) is formed as a plane extending at an incline.

15. The product stand-up device as claimed in claim 1, wherein each erecting path (12) is formed as an inclined and/or curved diverting path of a circulating path of a circulating belt and/or round belt.

16. The product stand-up device as claimed in claim 15, wherein each erecting path (12) is formed as an inclined diverting path of a circulating path of a circulating belt.

17. The product stand-up device as claimed in claim 15, wherein each erecting path (12) is formed as an inclined diverting path of a circulating path of a round belt.

18. The product stand-up device as claimed in claim 15, wherein each erecting path (12) is formed as a curved diverting path of a circulating path of a circulating belt.

19. The product stand-up device as claimed in claim 15, wherein each erecting path (12) is formed as a curved diverting path of a circulating path of a round belt.

20. A method for standing up products (11) of a plurality of product columns (20) in stack rows (30) each associated with a product column (20),
transporting products (11) via a common feeding unit (13) and/or by a separate removal transport unit (16) for each product column (20) in a removal direction;
erecting, via means of a separate erecting path (12) for each product column (20), the products (11), while the products (11) are moving in the removal direction;
moving, in at least one operating state, end members (38) of a stack row (30) via shifting means (21), which are each associated with a respective stack row (30), in the removal direction for a lining up of a following product (11) of the respective product column (20), wherein the shifting means (21) are controlled separately from one another; and moving the shifting means (21) in a linear manner by a plurality of separately controllable linear movement units (23).

* * * * *